Jan. 1, 1963   C. R. A. JOHNSON ET AL   3,071,772
RECORDER MARKER AND MARKER OPERATOR
Filed Sept. 1, 1959   5 Sheets-Sheet 1

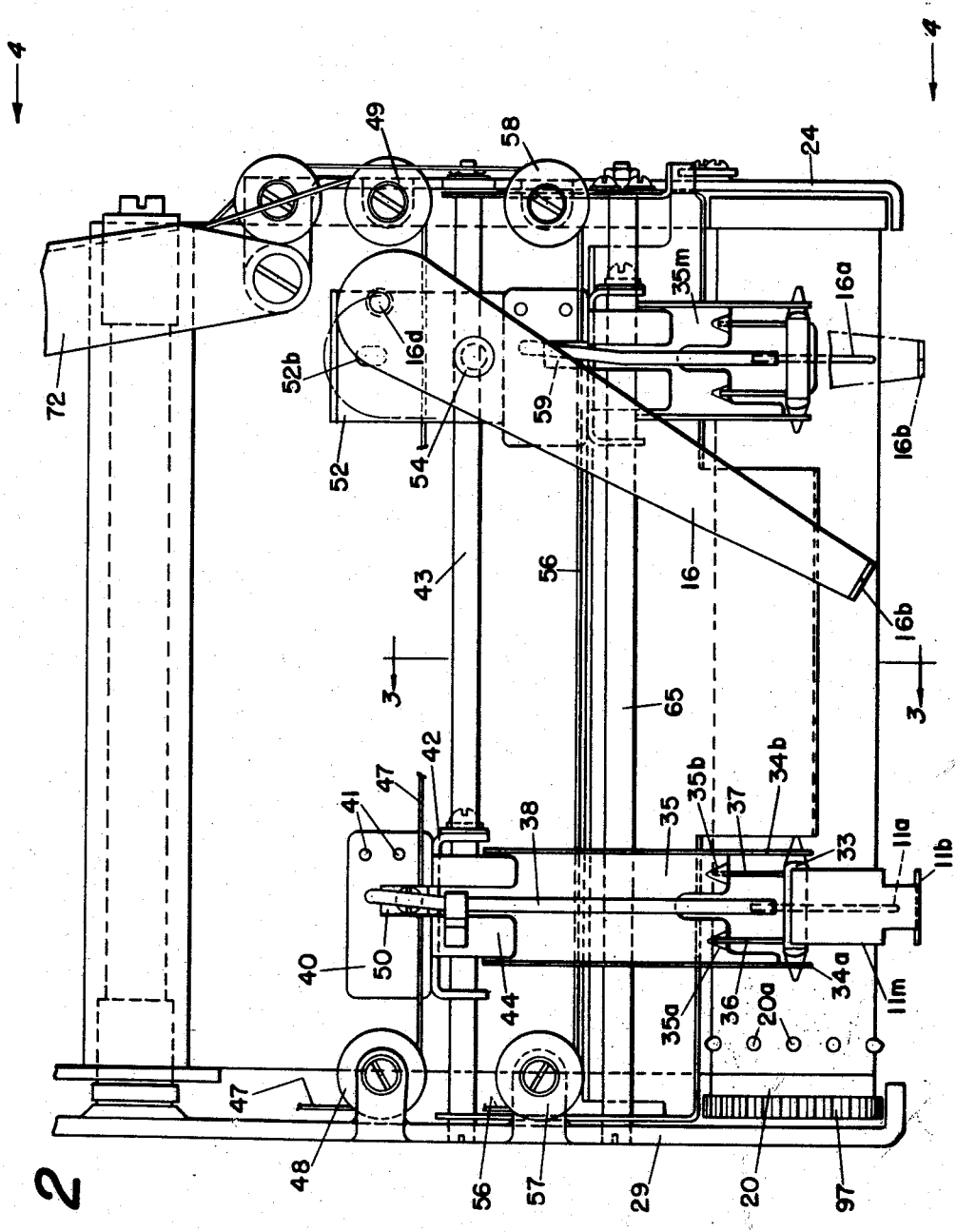

Jan. 1, 1963    C. R. A. JOHNSON ET AL    3,071,772
RECORDER MARKER AND MARKER OPERATOR
Filed Sept. 1, 1959    5 Sheets-Sheet 3

Jan. 1, 1963   C. R. A. JOHNSON ET AL   3,071,772
RECORDER MARKER AND MARKER OPERATOR
Filed Sept. 1, 1959   5 Sheets-Sheet 4

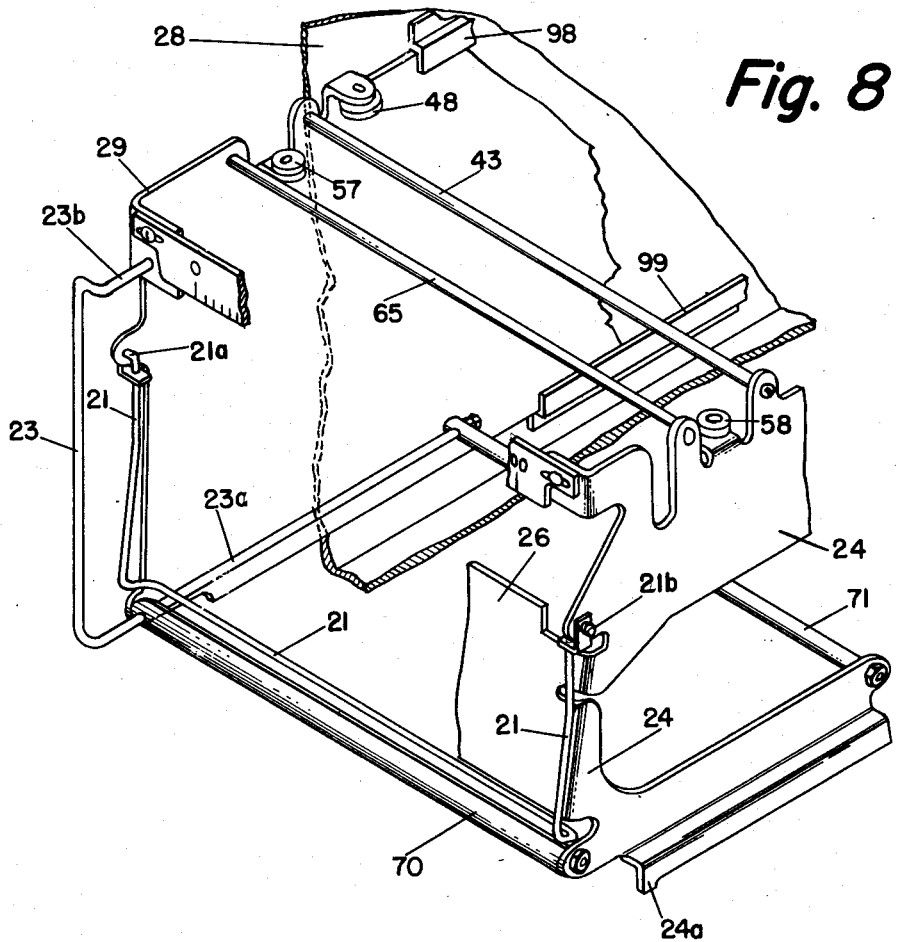
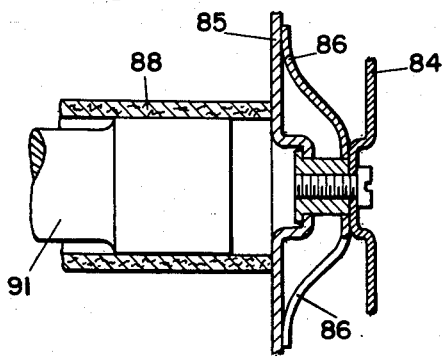
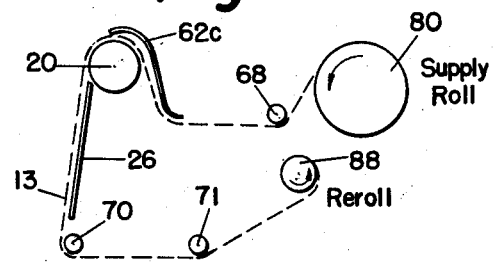

United States Patent Office 3,071,772
Patented Jan. 1, 1963

3,071,772
RECORDER MARKER AND MARKER OPERATOR
Curtis R. A. Johnson, Flourtown, Richard Garvin, Feasterville, Carl R. Ruppenthal, Erdenheim, Morris Joseph, Philadelphia, and Paul B. Binder, North Wales, Pa., assignors to Leeds and Northrup Company, Philadelphia, Pa., a corporation of Pennsylvania
Filed Sept. 1, 1959, Ser. No. 837,415
3 Claims. (Cl. 346—68)

This invention relates to improvements in exhibiting devices of the type employing a strip chart together with an associated scale and pen-index assembly for recording and indicating magnitudes of conditions under measurement.

It is an object of the present invention to provide a precision instrument of unusually compact design and which is adapted for the measurement of one or more quantities and for recording and indicating the magnitude of such quantities.

It can readily be understood that, as the size of instruments of the above character is decreased, there are presented many difficulties in providing the desired ruggedness coupled with the needed precision. More particularly, with charts and associated scales reduced to the order of four inches in contrast with the larger instruments with charts ten inches wide, it is necessary to depart from conventional practice in the assembly of the various components forming the instrument. Though the above considerations have been important to the instrument of the present invention, nevertheless the features hereafter to be explained in detail have advantages regardless of the size of the instrument.

In carrying out the present invention in one form, the strip-chart assembly for the recorder is supported from a vertically extending main frame slideably carried by a housing and from which frame extends in cantilever fashion the whole of the operating mechanism. This mechanism includes the supply and take-up rolls for the chart, one or more pen assemblies each of a design particularly adapted to the instrument of the present invention and including a pair of conical bearings supported between the arms in a U-shaped end of a frame, the pen-bearing member having extending therefrom spring-wire elements, one spring wire being disposed on one side and the other on the other side of the bracket member normally to bias the pen-carrying element in a predetermined position and for applying to the pen a predetermined force when the pen is moved into engagement with the chart.

For further objects and advantages of the invention and for detailed descriptions of other useful and novel features, reference is to be had to the following description taken in conjunction with the accompanying drawings in which:

FIG. 2 is a fractional plan view of the instrument with the housing omitted;

FIG. 8 is an isometric view of selected parts illustrating a number of selected features including the manner in which the chart may be withdrawn from the supporting plate for inspection of any selected length thereof;

FIG. 9 is an enlarged fractional sectional view of a pressure-producing assembly associated with the take-up roll; and FIG. 10 is a diagrammatic view showing the path of the chart through the instrument.

Figure 1:
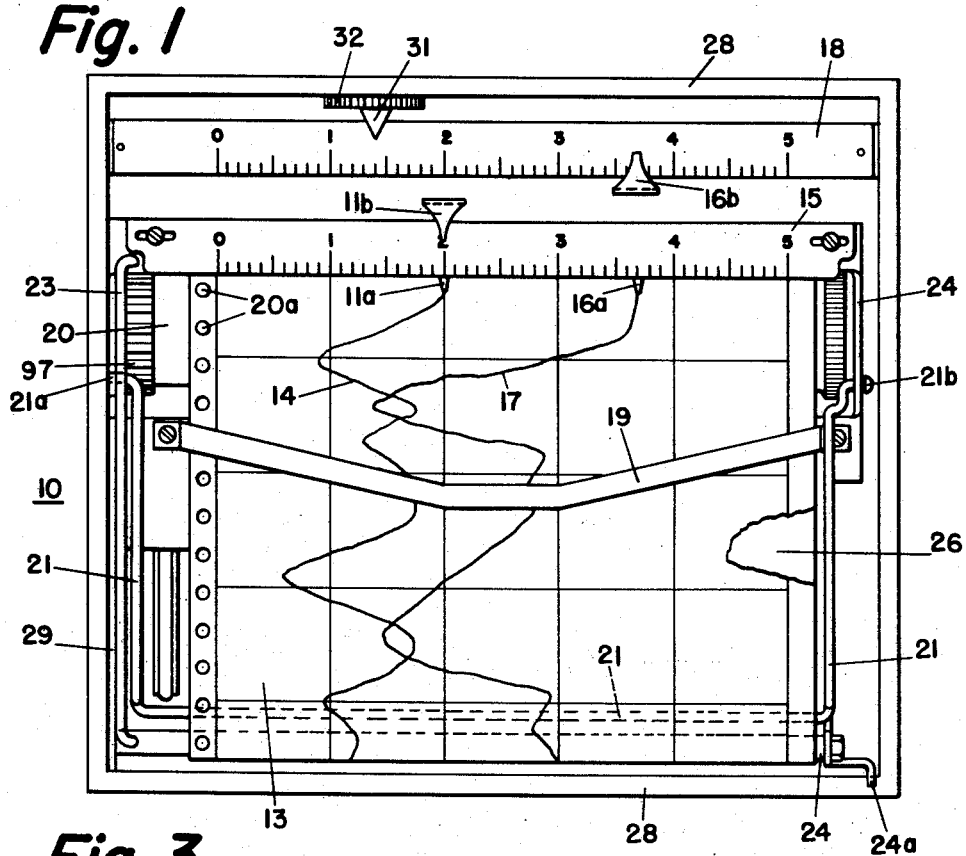
FIG. 1 is a front view of the instrument with the cover removed.

Referring to the drawings, particularly FIG. 1, the invention has been shown in one form as applied to an exhibiting instrument 10 of the X—X type, that is to say, one in which there may be indicated and recorded simultaneously magnitudes of two variables. Thus, the pen 11a forming a part of a pen-assembly including an index 11b records and indicates the magnitude of a variable as shown on a chart 13 by the trace 14 and as appearing on the associated scale 15. Similarly, a pen 16a forming a part of a pen-index assembly including an index 16b produces a trace 17 on the chart and an indication of the magnitude thereof on the scale 18. The chart 13 in FIG. 1 moves downwardly and beneath a tear-off bar 19. The chart is driven by a timing motor, later to be described, by means of pins 20a projecting from a chart roll 20 through circular openings of the chart 13.

If it be desired to remove a section of the chart from the instrument, a chart-lifting lever 21 is grasped near the lower end and pulled outwardly. This pulls a length of chart from the take-up roll. With a length of the chart thus pulled forward, the fingers may be inserted behind the chart to pull from the rolls any selected length. Thus the past record may be pulled below the tear-off bar 19 to sever it into the pattern of the bar. This provides the upper part of the chart with a symmetrically shaped end having a leading center portion and angularly extending side portions. This shape facilitates the threading of the chart.

The chart-lifting lever 21 is in the form of a round wire member generally of U-shape and with outwardly extending end portions 21a and 21b which extend through openings in a main frame member 29 and a sub-frame 24. The lower cross bar of the U-shaped pull-out member 21 extends toward the rear of the instrument as viewed in FIG. 1 so that it nests beneath a back-up plate 26 disposed directly behind the chart and thus the cross portion is removed from the path of the chart.

The chart assembly as a whole is mounted within the housing 28, being supported therein in cantilever fashion from the vertically extending main frame member 29. As will be later explained in detail, all parts of the assembly are carried by this single main frame member 29 though there is secured to it the sub-frame 24, FIG. 8, which has a down-turned end 24a, which with the recorder in its housing 28 rests upon a part of the housing. It will be noted that the chart back-up plate 26 is integral with the sub-frame 24, the parts being connected by the right angle bend therebetween.

The instrument 10, FIG. 1, may be utilized alone or together with a control-point setter. Where the control-point setter is included, it will have associated therewith an index 31. Thus the index 31 may, by suitable means such as a gear 32, be moved to a selected position along the scale 18 to indicate the magnitude of the condition to be maintained by a controller. In the illustration of FIG. 1, there has not been utilized the control feature just described. The control-point setter forms the subject matter of a co-pending application Serial No. 837,412, filed September 1, 1959, now Patent 2,980,876.

Figure 3:
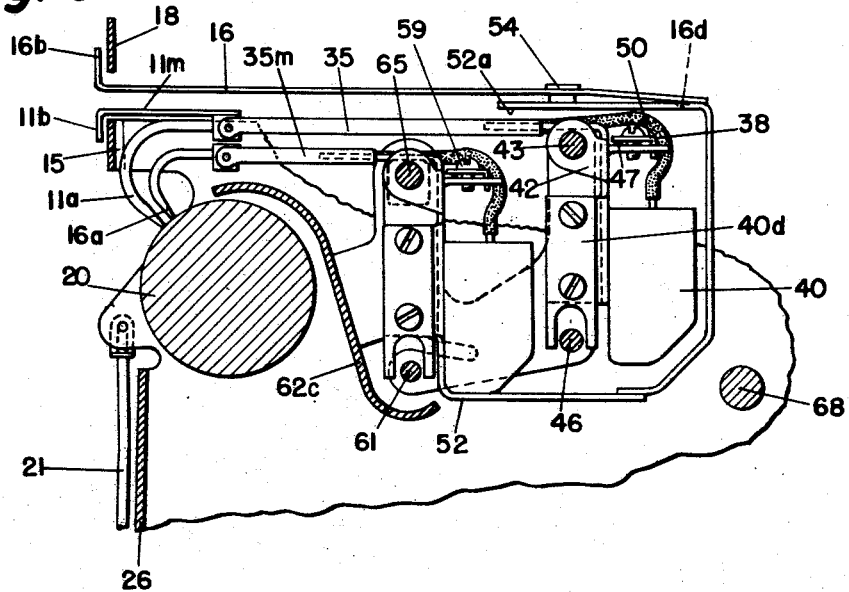
FIG. 3 is a sectional side view taken on the line 3—3 of FIG. 2 of the upper portion of the recorder but with both pens in view.
Figure 5:
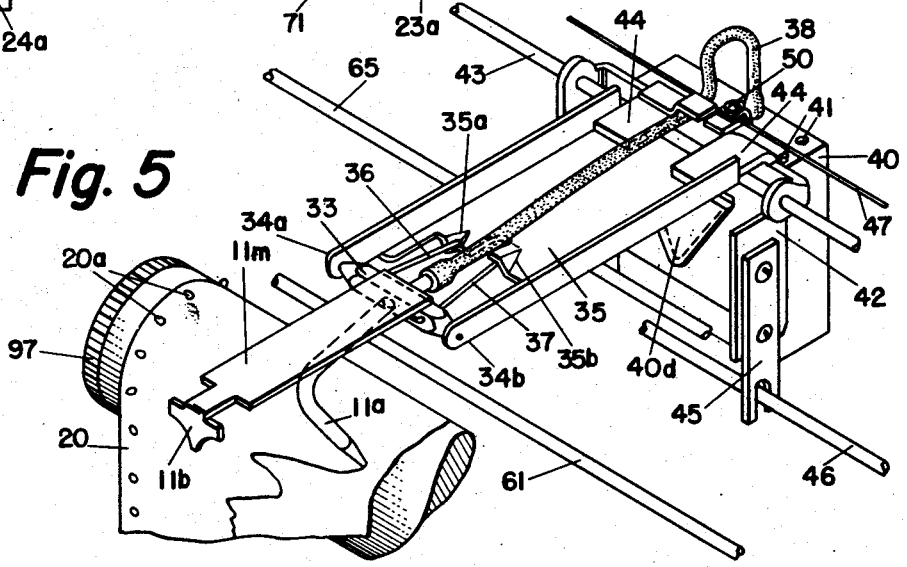
FIG. 5 is an isometric view of one of the pen-assemblies and associated supporting members.

Referring now to FIGS. 2, 3 and 5, it will be seen that the index 11b is the pointed down-turned end of a member 11m which is spot welded or otherwise secured to a pivoted support 33. This support or bearing member 33 has conical ends nesting within two openings of a pair of resilient arms 34a and 34b formed of a thin channel-shaped sheet metal member 35, the narrow sides thereof forming the support for the bearing member 33. Extending rearwardly from bearing member 33 are a pair of spring members 36 and 37 which are preferably formed of a U-shaped piece of spring wire passed through holes in member 33 and suitably secured as by cementing the bottom of the U to member 33. Each spring member extends into overlapping relation with the web portion of channel member 35, one member 36 being disposed on the upper surface of the web portion of member 35 and the other member 37 being disposed adjacent the lower surface of the web portion. The upper and lower surfaces of channel 35 are provided respectively with indentations or recesses 35a and 35b which are adapted respectively to receive the spring members 36 and 37, FIG. 5. In this manner the index 11b and pivoted member 33 are biased to a fixed and predetermined position with respect to the pen carriage. More importantly, the pen 11a is likewise biased to a fixed position inasmuch as the pen itself is formed by a capillary tube extending through and secured to the pivoted member 33. Ink is fed to the capillary tube and to the pen 11a by way of plastic tubing 38 which extends downwardly into an ink reservoir 40 having fill and vent holes 41 open to atmosphere. The channel-shaped member 35 is carried by a bracket 42, itself pivotally and slideably mounted on a rod 43 which is connected to frame members 29 and 24. The bracket 42 is provided with elements 44 which are spot welded to the web of channel member 35. The ink reservoir 40 is supported from a depending end, FIG. 3, of bracket member 42. The ink reservoir 40 is provided with a triangular-shaped extension 40d which extends through a similarly-shaped opening, FIG. 5, in the down-turned portion of bracket 42. The triangular-shaped extension 40d has overhanging edges so as to interlock with the triangular-shaped notch in the down-turned portion of the bracket 42. In order to predetermine the position of the carriage of the pen-index assembly, that is to say, the position in a substantially horizontal plane of the channel-shaped member 35, the down-turned portion of bracket 42 is provided with an adjustable plate 45 having a bifurcated end which is slideable with respect to a pen lifter guide rod 46. By loosening the screws there may be relatively adjusted the bracket 42 and the plate 45 to produce proper orientation of the parts.

The carriage including bracket 42 and channel member 35, FIG. 2, is translated by means of a driving cord 47 driven by a balancing motor, not shown, and threaded over pulleys 48 and 49, the driving cord 47 being secured to bracket 42 by a clamping member 50 and associated screw. The driving motor and the associated measuring system may be of the type shown in Williams' Patent 2,113,164 or in Williams' Patent 2,367,746.

The pen-assembly, so far described, including the index 11b may be utilized alone and without the need of a second pen-index assembly for indicating and recording the magnitudes of a variable condition. However, the exhibiting instrument of the present invention lends itself to the inclusion of the second pen assembly, FIG. 2, including index 16b and the associated pen 16a. In FIGS. 2 and 3, it may be observed that the parts are of quite similar construction the principal difference being that the channel member 35m is shorter than the corresponding member 35 of the pen assembly shown at the left in FIG. 2. In order to provide clearance for the assembly shown at the right relative to the assembly shown at the left so that they may pass each other, it will be noted, particularly, in FIG. 3, that the channel member 35m is located at a lower level than the corresponding member 35. On the other hand, the index 16b is located above the index 11b. This is accomplished by means of a bracket 52 which extends behind the ink reservoir 40 and upwardly terminating in a flat bracket extension 52a.

To this extension 52a there is pivotally secured a member 16, the up-turned portion 16b of which forms the above-described index. It will be noted that beyond the pivot pin 54 the member 16 has a dimple 16d, FIGS. 2, 3 and 6, which is arranged to rest within a slot 52b, FIG. 2, to maintain the member 16 in alignment with the pen 16a during measurement operations. In FIG. 2 the member 16 is shown swung to the left to expose the pen which from time to time may be removed for cleaning.

The driving cord 56 for the carriage including channel member 35m is threaded over pulleys 57 and 58, being secured to the carriage by a clamping member 59 in the same manner as described for the clamping member 50. It is to be further observed in FIG. 6 that the lower guide rods 46 and 61 for the respective carriages of the assembly including pen 16a and the assembly including pen 11a, FIG. 3, are secured between end members 62a, 62b, of a frame the intermediate portion 62c of which is cut away in FIG. 6. The subassembly including the lower guide rods 46 and 61 is pivoted on the upper rod 43 in order that the pens may be lifted from the recording paper when desired. The normal position for the subassembly will be with the pens engaging the recording paper. To provide downward or counterclockwise movement of the subassembly as viewed in FIG. 6, for automatically restoring the lifted pens to normal position, an arcuately shaped spring 64 is secured to an up-standing arm of side member 62b. The arcuate spring 64 is arranged to be displaced by engagement with a pin 63 on side wall of housing 28, FIG. 6, when the assembly is slid into operating position in the housing 28 as viewed in FIG. 1.

Figure 4:
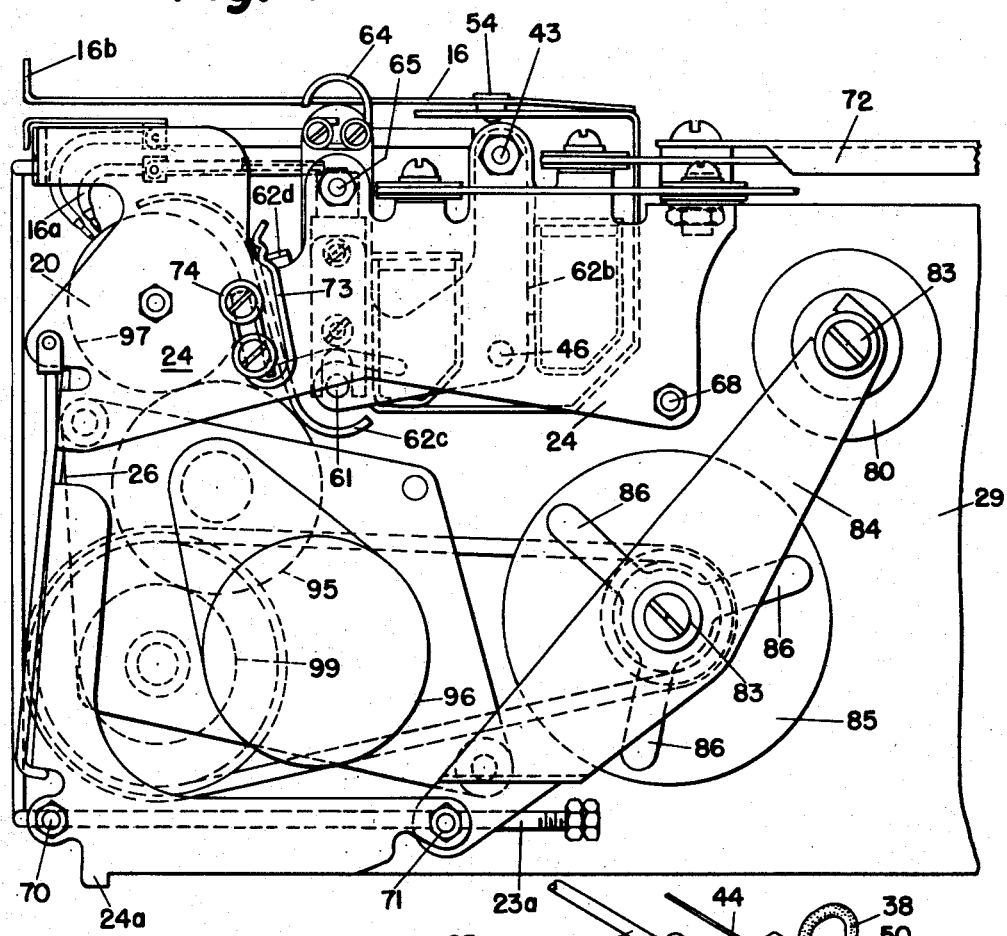
FIG. 4 is a side elevation taken in the direction of the arrows 4—4 of FIG. 2.

The upper rod 43 and its counter part 65, FIGS. 2 and 4, are rigidly secured to the main frame member 29 and the subframe 24. This subframe 24 includes the chart supporting or back-up plate 26. The subframe member 24 is supported from the main frame member 29 by means of the upper rods 43, 65 and a rod 68 bolted or rigidly secured to main frame member 29 and subframe member 24. Also assisting in the support of member 24 from member 29 are rods 70 and 71 which are rigidly secured to both members. The rods 68, 70, and 71 act as guides for the chart. To provide additional bracing for the subframe member 24, there is secured thereto a bracket 72, FIG. 2, which extends angularly toward and is secured to a bracket (not shown) fastened to the main frame member 29 (at a point not shown).

Figure 6:
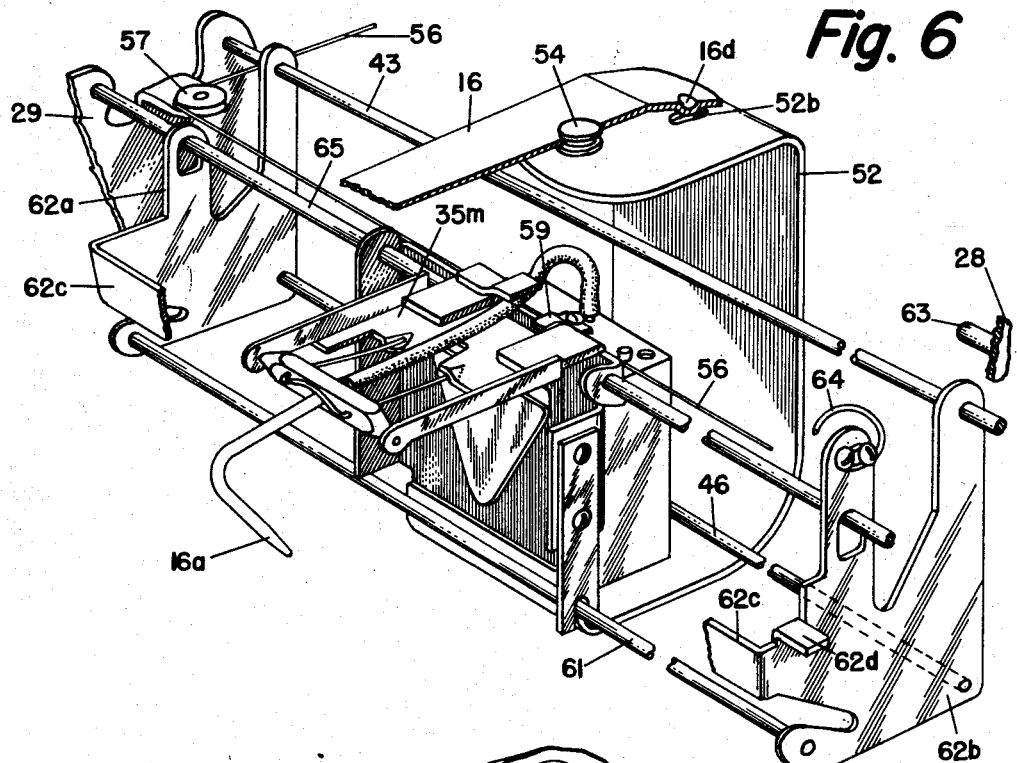
FIG. 6 is an isometric view of another of the pen-assemblies partly in section together with its supporting members.

Referring now to FIGS. 4 and 6, it will be observed that the subassembly including the side member 62b is shown pivoted on the rod 43 as explained above. The member 62b has an outward extension 62d arranged in cooperative relation with a spring-wire member 73, FIG. 4, secured to subframe 24 by screws 74. The upper end of the spring member 73 is preferably provided with several notches. The lower notch on which the extension 62d is resting serves to bias the carriage assemblies downwardly. However by lifting on the extension 62d, the assemblies may be lifted upwardly, the extension 62d then resting in the upper notch to hold the assemblies in the raised position with the pens 16a and 11a in spaced relation to the chart drive roll 20.

Figure 7:
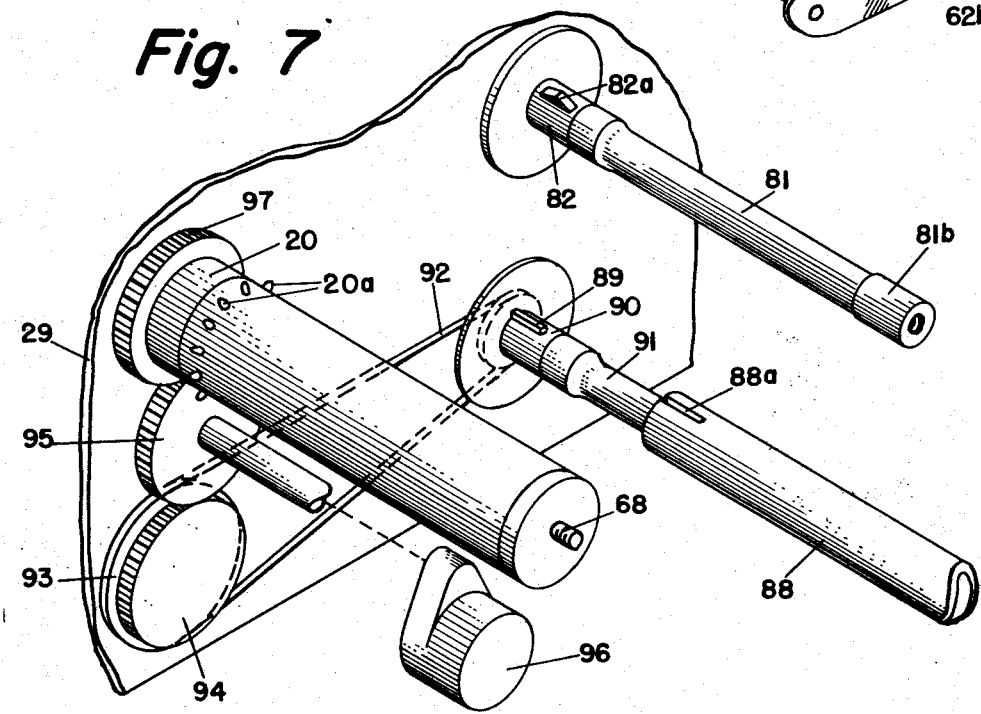
FIG. 7 is an isometric view of the chart supporting and driving rollers, the chart having been omitted.

Referring now to FIGS. 4 and 7, the chart-supply roll 80 is carried on a stationary rod 81, FIG. 7, which is cantilever-supported from the main frame 29. On the stationary rod 81 near the frame 29, there is rotatably mounted a flange sleeve 82 having outwardly bent spring elements 82a for engagement with the hard core on which the chart is wound. The outer end of rod 81 has an enlarged cylindrical end 81b on which the cylindrical hard core of the supply roll 80 may rotate. It will be observed that the end of rod 81 is threaded to receive a fastening screw 83, FIG. 4, arranged to hold in place an arm or bracket 84 pivotally carried on a shoulder of rod 71. Intermediate the ends of the arm 84 is a pressure assembly comprising a disc 85, FIGS. 4 and 9, normally biased away from arm 84 by a series of spring, spoke-like, elements 86. The re-wind roll for the chart is formed by a fibre cylindrical core 83, FIG. 9, having a slot 88a, FIG. 7, arranged to receive a driving lug 89 carried by a flange sleeve 90 which is rotatably mounted on a fixed stud shaft 91 supported in cantilever fashion from main frame 29. The flange sleeve 90 is driven by a belt 92 from a drive pulley 93 which is secured to a gear 94 meshing with a drive gear 95 and which through suitable reduction gearing is driven by a timing motor 96. The driving gear 95 also drives a gear 97 which serves to drive the chart-drive roll 20 carrying the drive pins 20a.

There has been shown in FIG. 10 the manner in which the chart 13 is threaded from supply roll 80 downwardly and across rod 68, thence upwardly across the guide plate 62c, which through its reverse curvature, guides and holds the chart 13 adjacent the chart-driving roll 20. The chart then extends downwardly along the front of the back-up plate 26 across the rod below and across the rod 70, and it is guided by the rod 71 to the take-up or re-wind roll 88. The pressure disc 85, FIG. 9, is pressed toward the outer end of the fibre core 88. The core 88 is of a length slightly less than the width of the chart, so that there is assurance that the pressure plate or disc 85 will engage the chart as it is wound on the re-wind roll and hold the further edge thereof against the flange of sleeve 90. This is desirable to produce a neatly rolled chart when re-winding. The re-wind roll 88 is driven as by belt 92, FIG. 7, which may be a coil spring riding on metal pulleys for establishment of a limited amount of torque on the take-up roll 88. This provides an over-drive, that is to say, provides a speed of rotation for the core 88 great enough to maintain the chart taut and provide additional slippage as the diameter of the chart on he take-up roll increases.

As explained in connection with FIG. 1, and as shown in FIG. 8, the vertically disposed main frame 29 is adapted to be slid into the housing 28 which is provided with guide brackets 98 and 99 to hold frame 29 snugly against a side wall of the housing. For ease in removing the indicating instrument from the housing, there is provided a handle 23 which has a lower arm 23a extending through the rods 70 and 71 and an upper arm 23b extending through an inturned ear on main frame 29. The inner ends of members 23a and 23b are threaded to receive nuts which engage respectively the inturned ear and the rod 71 for withdrawal of the instrument from the housing 28. During normal use, the pull handle 23 is pushed inwardly and is concealed behind a door (not shown) by reason of the outwardly offset intermediate portion as illustrated in FIG. 8.

The manner in which the chart pull-out rod 21 disappears during normal use is best shown in FIG. 8. It will be observed that the inturned intermediate section is disposed to lie in the space between the lower end of the chart back-up plate 26 and the chart guide rod 70. In this connection it is to be noted that the lower portions of the rod 21 are bent outwardly from the backup plate 26 for ease in grasping it to move the chart outwardly from the back-up plate. The re-winding roll 88 will permit adequate slippage of the chart to provide the necessary slack, and it likewise can be pulled from the supply roll 80. In this manner, there may be easily selected the lengths of chart to be inspected or to be removed from the instrument in the manner already set forth in connection with the tear-off bar 19, shown in FIG. 1.

By reason of the several features heretofore discussed at some length, there has been produced an exhibiting instrument unusually compact, reliable in operation, and capable of high precision in the measurement, control, indication, and recording of the magnitudes of one or more conditions. By providing the main frame 29 for the cantilever support of all of the principal component parts, including the driving motors (not shown), the arrangement lends itself to use with other components which may be included within or outside of the housing 28. Since the main frame 29 provides the sole support, it will be understood that the brackets 98 and 99 may be located at any desired position on the side wall of housing 28, thus to leave room for other subassemblies to be located below or above the recording instrument above described in detail. Similarly, by locating as many parts as possible on and adjacent the upright main frame member 29, room is provided in the housing 28 for other components which may in similar manner be slid from the opposite end and/or side of the housing on a second upright plate similar to the plate 29.

It is to be understood that this invention is not limited to the specific invention shown and that changes and modifications may be made within the scope of the appended claims.

What is claimed is:

1. In a strip-chart recorder including a chart supply roll, a take-up roll, and a drive roll, the subcombination comprising marker means for the chart including a capillary tube one end of which is adapted to engage the chart, said capillary tube being rigidly secured to a pivotal supporting element having its opposite ends provided with bearings, a carriage having arms adapted to receive said bearing ends of said supporting element rotatably to mount said capillary tube on said carriage, said carriage having an intermediate portion disposed between said arms, said intermediate portion having retaining structure disposed respectively on opposite surfaces thereof, and resilient members secured to said supporting element and normally disposed one on one side and the other on the opposite side of said intermediate portion of said carriage and engaging said retaining structure to bias said capillary tube in a predetermined position relative to said carriage, said resilient members allowing relative movement between said capillary tube and said carriage as said capillary tube is moved into engagement with the chart.

2. In a strip-chart recorder including a frame, said frame having means for supporting thereon a supply roll, a take-up roll, and a drive roll for a chart, the subcombination of a marker assembly including marker means engageable with the chart to provide a record thereon, a carriage for supporting said marker assembly, means extending transversely of the chart for pivotally and slideably supporting said carriage, means including a swingable frame for rotating said carriage and thereby the marker means of said marker assembly into and out of engagement with the chart, a housing for said recorder, means for supporting said frame for slideable movement of said recorder into and out of said housing, and means supported by said housing and coacting with said swingable frame to move said carriage and thereby move said marker means into engagement with said chart upon movement of said recorder into said housing.

3. In a strip-chart recorder including a frame, said frame having means for supporting thereon a supply roll, a take-up roll, and a drive roll for a chart, the subcombination of marker means for said chart rigidly secured to a supporting element having bearing means, a carriage adapted to receive said bearing means of said supporting element to mount said marker means for rotation about a horizontal axis, resilient members secured to said element and normally disposed one on one side and the other on the opposite side of a portion of said carriage to bias said marker means in a predetermined position relative to said carriage, means extending transversely of the chart for slideably and pivotally supporting said carriage, and means rotatable about a horizontal axis to move said carriage about said pivotal supporting means thereby to move said marker means relative to the chart, said resilient members limiting movement of said marker means about the horizontal axis of its supporting element bearing means to permit raising and lowering said marker means from and into contact with the chart.

References Cited in the file of this patent

UNITED STATES PATENTS

| | | |
|---|---|---|
| 1,690,517 | Wilson et al. | Nov. 6, 1928 |
| 1,847,918 | Blanchard | Mar. 1, 1932 |
| 2,211,317 | Brown | Aug. 13, 1940 |
| 2,618,528 | Caldwell | Nov. 18, 1952 |
| 2,655,426 | Barnes | Oct. 13, 1953 |
| 2,663,609 | Jones | Dec. 22, 1953 |
| 2,719,293 | Hornbruch et al. | Sept. 27, 1955 |
| 2,852,197 | Virbila | Sept. 16, 1958 |
| 2,885,255 | Pignone | May 5, 1959 |
| 2,913,299 | Clift | Nov. 17, 1959 |
| 2,932,776 | Massa | Apr. 12, 1960 |

FOREIGN PATENTS

| | | |
|---|---|---|
| 1,172,311 | France | Oct. 13, 1958 |